(12) United States Patent
Melhem

(10) Patent No.: US 7,508,685 B2
(45) Date of Patent: Mar. 24, 2009

(54) STABILIZED POWER SUPPLY

(75) Inventor: Wissam Melhem, Orgeval (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 11/936,553

(22) Filed: Nov. 7, 2007

(65) Prior Publication Data

US 2008/0049463 A1    Feb. 28, 2008

Related U.S. Application Data

(63) Continuation of application No. 11/061,585, filed on Feb. 18, 2005, now Pat. No. 7,315,462.

(30) Foreign Application Priority Data

Apr. 21, 2004   (FR) .................................... 04 50758

(51) Int. Cl.
*H02M 5/45* (2006.01)
(52) U.S. Cl. .................. 363/37; 363/21.08; 363/40; 363/131
(58) Field of Classification Search .............. 363/37, 363/21.08, 40, 131
See application file for complete search history.

(56) References Cited

U.S. PATENT DOCUMENTS

| 4,639,844 | A | 1/1987 | Gallios et al. |
| 4,639,849 | A | 1/1987 | Noworolski et al. |
| 5,038,267 | A | 8/1991 | De Doncker et al. |
| 5,189,602 | A | 2/1993 | Callier et al. |
| 6,031,737 | A * | 2/2000 | Green ........................ 363/37 |

OTHER PUBLICATIONS

Y. Khersonsky, et al; Overcoming the Limitations of Soft-Switched, High-Frequency, High-Power Isolated DC-DC Converter; 2000; IEEE; pp. 866-871.

* cited by examiner

*Primary Examiner*—Akm E Ullah
*Assistant Examiner*—Ramy Ramadan
(74) *Attorney, Agent, or Firm*—Cantor Colburn LLP

(57) ABSTRACT

A stabilized power supply for X-ray tubes having a first rectifier circuit, an inverter circuit comprising main switches, a transformer, a second rectifier circuit an oscillation circuit and an inverter circuit. The power supply includes an auxiliary circuit that can be driven and is parallel-connected to the oscillation circuit. The auxiliary circuit duplicates changeover switching times of the switches of the inverter in order to limit an overlapping phenomenon that occurs for these switches during the changeover switching operations.

6 Claims, 3 Drawing Sheets

PRIOR. ART.

STABILIZED POWER SUPPLY

CROSS-REFERENCE TO RELATED APPLICATIONS

This application is a continuation application of U.S. application Ser. No. 11/061,585 filed Feb. 18, 2005, which claims the benefit of a priority under 35 USC 119(a)-(d) to French Patent Application No. 04 50758 filed Apr. 21, 2004, the entire contents of each hereby incorporated by reference.

BACKGROUND OF THE INVENTION

An embodiment of the present invention relates to a stabilized power supply and in particular for X-ray tubes. An embodiment of the invention can be applied but not exclusively in the field of medical imaging.

An X-ray tube generally comprises a cathode and an anode. The cathode has a filament through which there flows a current known as a heating current. An electrical signal at a high dc voltage of about 150 kV is applied between the anode and the cathode of the tube. The voltage of the signal gives rise to a stream of electrons flowing from the cathode to the anode. In general, an operating point of the tube is defined by the voltage applied between the anode and the cathode and the heating current crossing the filament. Thus, for a given voltage applied to its terminals and an intensity of current traveling through it set by the heating current, the X-ray tube may be considered to be a variable resistor.

To apply an electrical signal of high dc voltage between the anode and the cathode, a stabilized power supply is generally used. This stabilized power supply comprises especially two diode bridges, one inverter and one transformer. To chop a dc voltage electrical signal, the inverter comprises switches, each formed by one diode and one controlled element such as a transistor or a thyristor. Working in sets of two, these switches successively provide for the application of a dc voltage in one direction and then in another, at the terminals of an oscillating circuit in order to create positive and negative half-waves of the current therein. In one example of an embodiment, an electrical signal controls a transistor of the switch. When this signal turns the transistor on, the switch is closed. When the signal turns the transistor off, the switch is opened. When a switch is opened, an over-voltage associated with a variation of a current can be observed at the terminals of this switch. This phenomenon occurs at the instant, called the triggering instant when these diodes go off. During this triggering instant, an overlapping between the voltage at the terminals of this switch and the current crossing this switch causes unnecessary consumption of energy. This unnecessary energy dissipated by the switches is almost negligible for a low change-over switching frequency. However, this energy is not negligible for a high change-over switching frequency, as is the case with the inverter of the X-ray tube.

To attenuate the triggering over-voltage, there is a known resonance inverter. This inverter has a change-over switching frequency that is lower than a resonance frequency of a load. This resonance inverter works well but not as efficiently as desired. This is because the switches of this inverter are connected to a circuit comprising a coil that generates an over-voltage observable at the terminals of the switches. A damping system is furthermore necessary to protect switches during an overlapping of the diodes. This system can give rise to distortions in the electrical signals of the inverter and furthermore introduce energy losses that reduce the efficiency of this inverter.

BRIEF DESCRIPTION OF THE INVENTION

An embodiment of the invention is directed to resolving distortions and losses introduced by the damping circuit. An embodiment of the invention is directed to limiting power losses in such a supply.

An embodiment of the invention relates to a stabilized power supply comprising: a first voltage rectifier circuit connected to an alternating electrical power generator; an inverter circuit connected to the rectifier circuit and comprising main switches and an oscillation circuit; a transformer connected to the inverter; a resonant circuit, the transformer being series-connected in this resonance circuit; a second rectifier circuit to rectify the alternating signal observable at output of the transformer; and an auxiliary circuit that can be driven and is parallel-connected to the oscillation circuit.

BRIEF DESCRIPTION OF THE DRAWINGS

The invention can be better understood from the following description and the accompanying figures. These figures are given by way of an illustration but in no way restrict the scope of the invention. In the figures.

DETAILED DESCRIPTION OF THE INVENTION

Figure 1A:
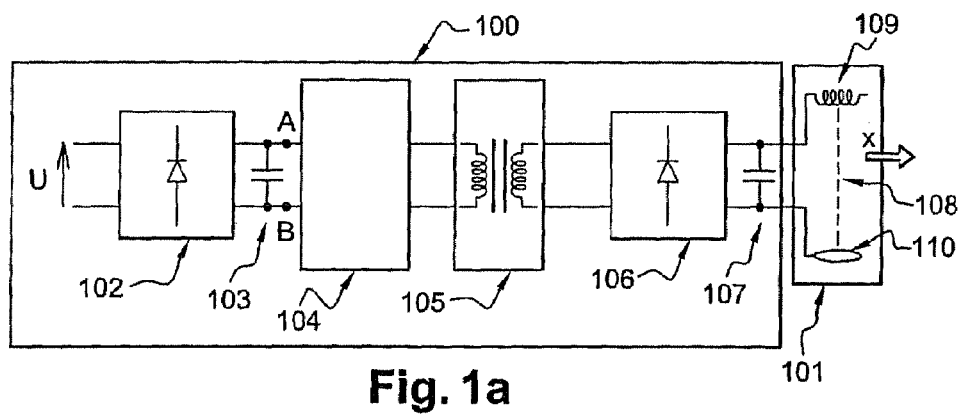
FIG. 1a shows the structure of a stabilized power supply connected, for example, to an X-ray tube.

FIG. 1a shows a stabilized power supply 100 powering an X-ray tube 101. Power supply 100 comprises a rectifier circuit 102, an inverter 104, a transformer 105 and a second rectifier circuit 106, these elements being all series-connected with one another.

An electrical voltage generator delivers an alternating electrical voltage signal U at low frequency and low amplitude. Electrical voltage signal U is rectified by means of the first rectifier circuit 102 comprising diodes. The rectified signal observable at output of the first circuit 102 is smoothed by a first capacitor 103 parallel-connected with output terminals of this circuit 102. Thus, a low dc voltage electrical signal is applied to the input terminals A and B of the inverter 104.

From this low dc voltage electrical signal, the inverter 104 generates a high-frequency ac electrical signal at its output. This high-frequency ac electrical signal is applied to the input terminals of the transformer 105. Since the transformation ratio of the transformer is very great, a high-frequency ac electrical signal can be observed across the output terminals of the transformer 105. This ratio is chosen as a function of the characteristics of a given X-ray tube.

The high-frequency current electrical signal is applied to input terminals of the second rectifier bridge 106 comprising diodes. The voltage signal observable across output terminals of this bridge is smoothed by means of the second capacitor 107 parallel connected with the second bridge 106. At the terminals of this second capacitor 107, a high dc voltage electrical signal can therefore be observed.

Since the terminals of the capacitor 107 are connected to the terminals of the X-ray tube 101, the dc high voltage electrical signal is applied between the cathode and the anode of the tube. A stream of electrons 108 then appears between this cathode 109 and this anode 110 and causes an emission of X-rays.

Figure 1B:
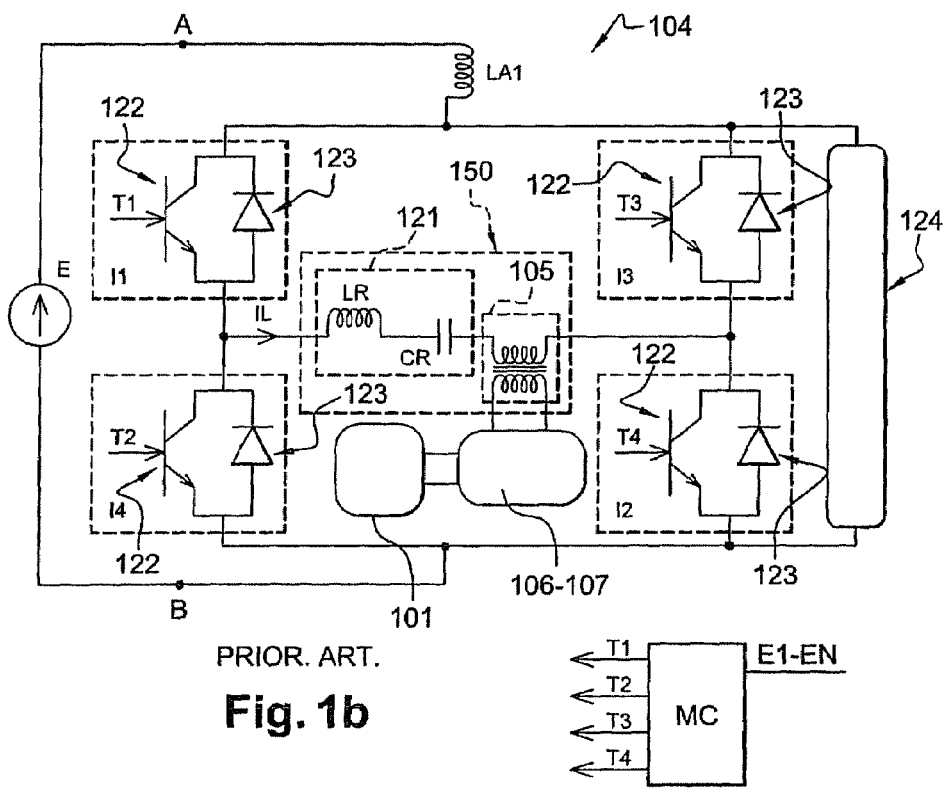
FIG. 1b shows a prior art resonance inverter.

FIG. 1b shows a mode of forming the inverter 104 located between the first rectifier bridge 102 and the transformer 105. The circuit 104 of FIG. 1b is a prior art resonance inverter. The circuit 104 comprises four main switches I1-I4 series-connected in sets of two and a voltage source E. Source E delivers a dc voltage with a value E and corresponds to the electrical voltage signal observable at the terminals of the first capacitor 103. This voltage source, series-connected with a coil LA1, is connected between two midpoints of the circuit constituted by the four main switches I1-I4. It is also said that the source and the coil LA1 are connected to the direct-current bus of the circuit formed by the four switches I1-I4.

An oscillation circuit 150 is connected between the two midpoints of the circuit constituted by the four main switches I1-I4, these two midpoints being other than those to which the inductor LA1 and the source E are connected. In this oscillation circuit 150, a resonant circuit 121 and the primary winding of the transformer 105 are series-connected. In one embodiment, the resonant circuit 121 consists of a coil LR series-connected with a capacitor CR. The terminals of the secondary winding of the transformer 105 are connected to input terminals of an assembly 106-107 comprising the second diode bridge 106 and the second capacitor 107. Output terminals of this assembly are connected to terminals of the X-ray tube 101.

Each main switch I1-I4 comprises a transistor 122 and a diode 123. In each main switch I1-I4, an emitter of the transistor 122 is connected to an anode of the diode 123 and a collector of the transistor 122 is connected to the cathode of the diodes 123. The transistors 122 of the main switches I1-I4 are on when the main switches I1-I4 are closed. By contrast, these transistors 122 are off when the main switches I1-I4 are open. The diode 123 permits a return of a current. The changeover switching of the switches I1-I4 ensures the application of the voltage E to the terminals of the oscillation circuit 150 in one direction and then in another. More specifically, in an initial state in which the switches I1-I2 are closed and the switches I3-I4 are open, the voltage applied to the oscillation circuit 150 is equal to E. Following a change-over switching operation, the switches I1-I2 are open and the switches I3-I4 are closed. The voltage applied to the oscillation circuit 150 is then equal to –E. Another changeover switching operation makes the switches return to their initial state and so on and so forth.

Control signals T1-T4 come from a microcontroller MC comprising memories and a processing unit. These control signals applied to the base (or the gate) of the transistors 122 control the closing of the switches I1-I4 in a time-staggered way. When the signals T1 and T2 activate closure of the switches I1 and I2 associated with them, the signals T3 and T4 activate an opening of the switches I3 and I4 associated with them and vice versa. The control signals T1-T4 are determined from input signals E1-EN resulting, in one example, from a regulation of an output signal, such as the electrical voltage signal applied to the terminals of the X-ray tube. In a particular example, the input signals E1-EN processed by the microprocessor modify an output frequency of the inverter as a function of a desired intensity of X-rays.

A damping circuit 124 is connected to the direct-current bus of the circuit formed by the main switches I1-I4. The damping circuit 124 limits the parasitic resonance phenomena caused especially by parasitic capacitors and coils of the diodes that appear during a high-frequency changeover switching operation. However, the circuit 124 generates energy losses and may induce distortions in the signals of the inverter.

Figure 2:
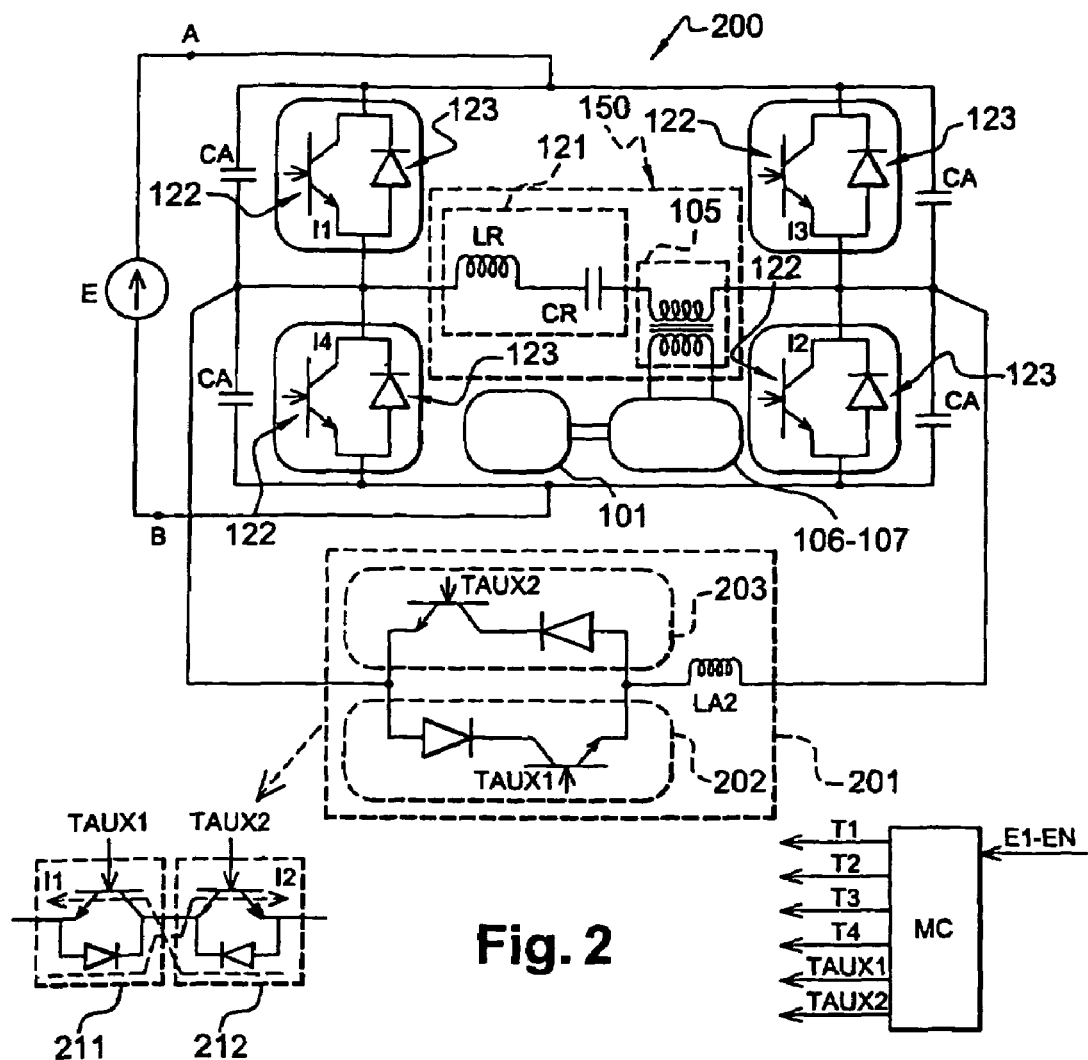
FIG. 2 shows an inverter according to an embodiment of the invention, comprising an auxiliary circuit parallel-connected with an oscillation circuit.

FIG. 2 shows an inverter 200 according to an embodiment of the invention. The main switches I1-I4, the oscillation circuit 150, the assembly 106-107 comprising the second bridge diode 106 and the second capacitor 107, the tube 101, and the voltage generator E are still present in this inverter 200 made according to an embodiment of the invention. However, the damping circuit 124 and the coil LA1 of the prior art inverter circuit 104 have been replaced by an auxiliary circuit 201 and capacitors CA.

Capacitors CA is parallel-connected with each main switch I1-I4. The auxiliary circuit 201 is parallel connected with the oscillation circuit 150. This auxiliary circuit 201 may have two parallel-connected assistance circuits 202 and 203, and a coil LA2 series-connected with the two circuit 202 and 203. The change-over switching of the assistance circuits 202 and 203 associated with the change-over switching of the different main switches I1 I4 limits the power dissipated by the diodes and eliminates a problem pertaining to the overlapping of these diodes.

The coil LA2 associated with the capacitors CA can make a current flowing through them enter into resonance. This entry into resonance, as will be seen in FIG. 4a, substantially eliminates energy losses when, the diodes 123 are off, in compensating for the voltages of certain signals.

As in the case of the inverter 104, the signals T1-T4 controlling the switches I1-I4 are sent out by a microcontroller MC. Signals TAUX1-TAUX2 controlling the assistance circuits 201 and 202 are sent out by the microcontroller MC. As seen in FIG. 2a, signals TAUX1 and TAUX2 are used to control the auxiliary circuit at different times. All the signals T1-T4 and TAUX1-TAUX2 are prepared through a processing of input signals E1-EN that may enable a voltage control of the stabilized power supply 100. In one example, the signals E1-EN are obtained from comparators in order to compare the signal delivered by the inverter with an instructed-value signal.

The assistance circuits 202 and 203 can be made out of two elementary circuits, each comprising a diode and a transistor. These elementary transistors are mounted in a tumbled manner or "upside town to each other". The expression "mounted in a tumbled manner" is understood to mean that an emitter of the transistor of the first assistant circuit 202 is connected to the anode of the diode of the second assistance circuit 203 and that the emitter of the transistor of the second assistance circuit 203 is connected to the anode of the diode of the first assistant circuit 202.

The two assistance circuits 202 and 203 can be made out of independent components, for example by an assembly of a diode and a MOS or bipolar type of transistor. However, it is possible to use auxiliary switches 211 and 212 comprising a transistor and a diode to make these assistance circuits. These switches are of the same type as the main switches I1-I4.

In a particular embodiment, two switches 211 and 212 are series-connected so that the collectors of the transistors and the cathodes of the diodes are connected together to a same potential. A current I1 can then flow in one direction through these switches, when the switch 211 is closed. Current I1 flows through the diode of the switch 212 and the transistor of the switch 211. However, when the switch 212 is closed, a current I2 flows in another direction through these switches 211 and 212. Current I2 flows through the diode of the switch 211 and the transistor of the switch 212.

In a variant embodiment, the microcontroller MC is replaced by a microprocessor comprising memories and input-output registers. In another variant embodiment, the microcontroller MC is replaced by circuit comprising logic gates.

Figure 3:
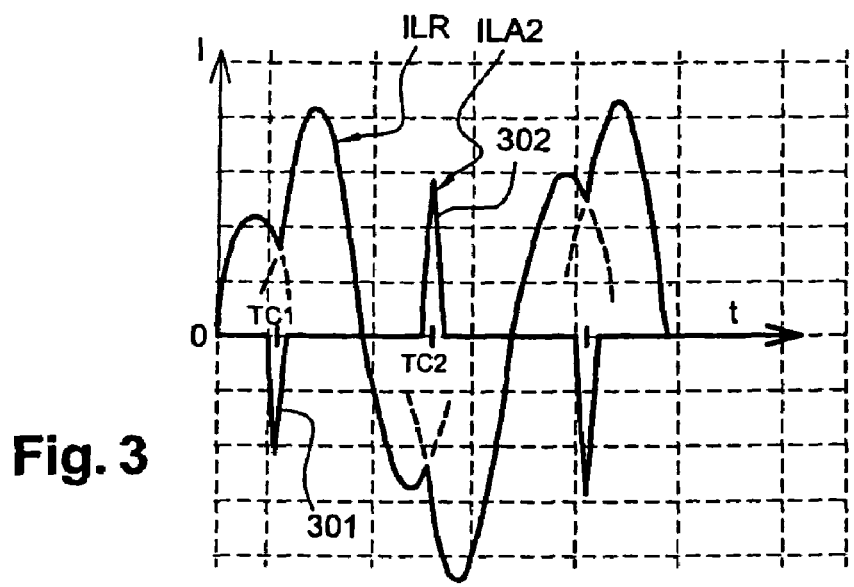
FIG. 3 is a graphic view of electrical current signals traveling through an oscillation circuit and an auxiliary circuit of an inverter according to an embodiment of the invention.

FIG. 3 is a graph showing a current ILA2 flowing through the coil LA2 of the auxiliary circuit 201 as well as a current ILR flowing through the coil LR of the resonant circuit 121. The graphic representation of the current ILR has the classic form of a graphic representation of a current flowing in a resonance circuit of an inverter. At the change-over switching instant TC1, the switches I1 and I2 are closed, while the switches I2 and I3 open. The voltage at the terminals of the oscillation circuit 150 is then positive so that, initially, a positive half-wave can be observed in the representation of the current ILR. In a second stage, the half-wave that can be observed in the graphic representation of the current ILR is inverted. Current ILR is then negative and flows in the circuit formed by the oscillation circuit 150 and is fed back in a return loop into the generator E, in passing through the return diodes 123 of the closed switches I1 and I2.

At the instant TC2, there is a changeover switching operation, so that the switches I1 and I2 open, and the switches I3 and I4 are closed. The negative half-wave is then prolonged and becomes positive. As compared with the changeover switching operation at the instant TC1, the half-waves are reversed. Then, at other instants, the switches I1-I4 again switch over so as to make the current signal ILR periodic.

The dashed portion of the curves in FIG. 3 represents the theoretical shapes of the graphic representations of the current ILR if no changeover has occurred. The oscillation frequency of the control signal ILR depends on the values of the elements of the resonant circuit 121.

At the changeover instants TC1 and TC2, peaks 301 and 302 of intensity of the current ILA2 are noted. These peaks 301 and 302 have opposite directions to the half-waves of the current ILR and limit any overlapping of the diodes of the switches. These peaks compensate for any excessive current flowing through the diodes of the main switches I1-I4 which may prompt an over-voltage at the terminals of these switches when the diodes are off.

Figure 4A:
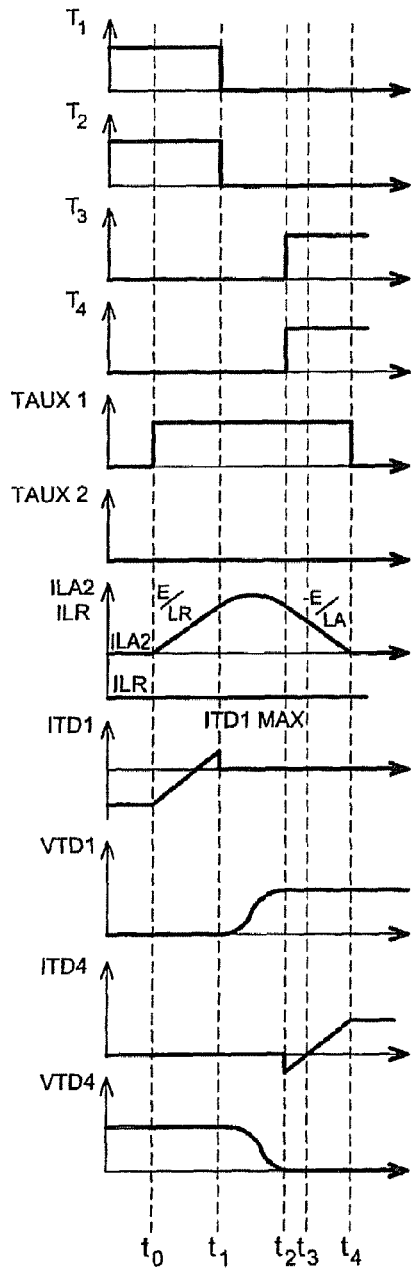
FIGS. 4a and 4b are timing diagrams of different electrical signals observable in the inverter according to an embodiment of the invention.
Figure 4B:
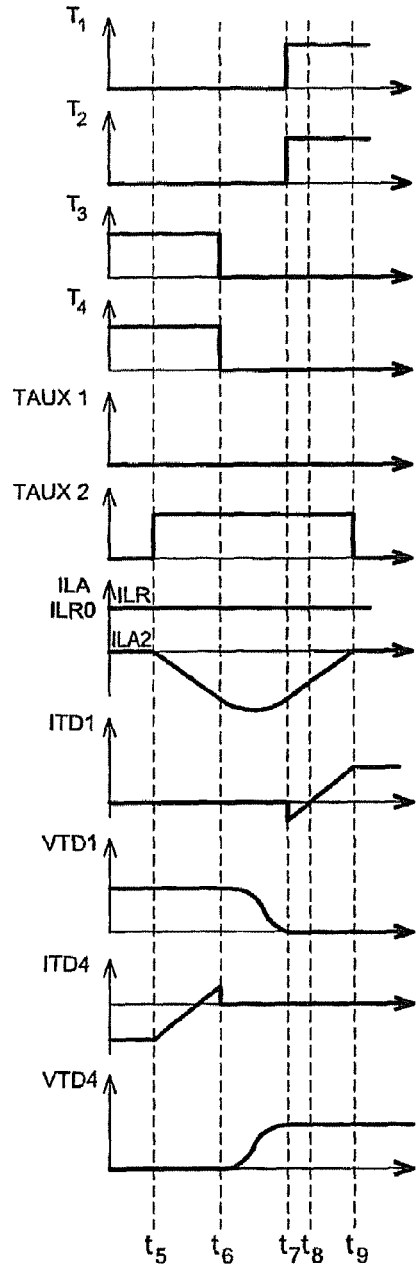

The changeover instants TC1 and TC2 are shown in greater detail in FIGS. 4a and 4b. FIGS. 4a and 4b show a graph showing different signals of the inverter according to an embodiment of the invention 200 through a change-over switching period. Since this changeover switching takes place in an extremely short duration, the current ILR flowing through the coil LR is considered to be constant throughout this change-over. FIGS. 4a and 4b reveal an influence of the change-over of the switches I1-I4 on signals observable at the terminals of the components of the inverter 200. More precisely, the potentials of the control signals T1-T4 of the switches I1-I4 are shown at the time of a change-over switching operation as are the control signals TAUX1-TAUX2 of the auxiliary circuit. Since the assembly of the inverter according to an embodiment of the invention is symmetrical, only voltages and currents associated with the switches I1 and I4 are shown.

In FIG. 4a, in an initial state, the charging voltage measurable at the terminals of the oscillation circuit 150 is deemed to equal to E. The switches I1 and I2 are closed and crossed by a negative current. Thus, in the graphs, the voltages of the control signals T1 and T2 of the transistors of the switches I1 and I2 are not zero and correspond to a logic value 1. Furthermore, the voltages of the control signals TAUX1 and TAUX2 of the auxiliary circuit 202 and 203 are zero. The transistors controlled by these signals TAUX1 and TAUX2 are therefore off.

At the instant t0, the auxiliary circuit is controlled so that the transistor controlled by the signal TAUX1 comes on. The signal TAUX1 then has the potential corresponding to a logic 1 state, and the coil LA2 is connected to the dc voltage source E by means of closed switches I1 and I2. A positive electrical voltage signal E is therefore applied to the terminals of this coil LA2 and the intensity of the current ILA2 crossing this coil increases with a slope equal to E/LA. The currents flowing within the main switches I1 and I2 correspond to the current ILA2 and therefore have an intensity that increases identically.

At the instant t1, the switches I1 and I2 are opened. The voltages of the control signals T1 and T2 are then equal to 0. The four capacitors CA and the coil LA2 then form a resonance circuit. The two capacitors CA are charged at +E and the other two are discharged. An oscillation then starts arising in the signals crossing the components CA and LA2. The voltage VTD1 that can be observed at the terminals of the switch I1, the voltage VTD4 that can be observed at the terminals of the switch I4 and the voltage VTD1 that can be observed at the terminals of the switch I1 thus initiate oscillations of different forms. The voltage VTD1 describes a start of an oscillation symmetrical to the one described by the voltage VTD4, the sum of the voltages of these two signals being equal to E. At the end of the oscillation, the voltage observable at the terminals of the switches I3 and I4 is equal to 0. More particularly, the voltage of the signal observable at the terminals of the diodes forming these switches is zero. Consequently, the two diodes of the two switches I3 and I4 again become conductive.

At the instant t2, the switches I3 and I4 are closed, the diodes that form them being conductive. The coil LA2 then has a voltage equal to −E at its terminals. The intensity of the current ILA2 then diminishes with a slope equal to −E/LA.

At the instant t3, the diodes of the switches I3 and I4 go off, and the corresponding transistors start becoming conductive. The switches I3 and I4 are still on.

At the instant t4, an intensity of the current ILA2 is equal to 0. The switch I4 and the switch I3 are still on. From the instant t4 onwards, the control signal TAUX1 is reset at zero and auxiliary circuit is off. From the instant t4 onwards, the changeover switching from +E to −E may be considered to be completed.

Thus, the auxiliary circuit 201 introduces changeover instants t0 and t4 in addition to the instants t1 and t2 for the switching over of the switches. This introduction of additional change-over instants ensures that the currents and voltages crossing the switches I1-I4 never have values of non-zero at the same time. In an embodiment of the invention, the current and voltage peaks associated with each switch therefore never overlap and there is therefore no longer any loss of energy during a change-over switching operation. For example, in FIG. 4a, for the switch I1, through the introduction of the date t0, the transition period of the voltage between the instants t1 and t2 is quite distinct from the transition period of the current between the instants t0 and t1. In comparison, in the prior art, these transition periods were superimposed since they were triggered at the same time, when the switch I1 was closed, namely at the instant t1.

Furthermore, because of the auxiliary circuits 202 and 203 of the invention, no over-voltage can be observed at the terminals of the main switches I1-I4. The maximum voltage that these switches I1-I4 must bear is equal to the maximum voltage of the voltage source E used. In limiting the voltage applied to the terminals of the switches I1-I4 of the main circuit, the auxiliary circuit 201 prevents any premature dysfunction in this inverter 200. Furthermore, since the changeover switching operations of the switches I1-I4 are more precise and are less liable to undergo variations, the power supply obtained according to an embodiment of the invention can deliver an alternating electrical signal whose amplitude is a very precise.

The changeover from −E to +E shown in FIG. 4b is achieved in the same way as the changeover from +E to −E. However, in this change-over switching operation, the auxiliary circuit 203 is turned on instead of the auxiliary circuit 202. Here too, the signal TAUX2 controlling the auxiliary circuit 203 makes it possible to duplicates the change-over dates t6 and t7 corresponding respectively to the opening of the switch I1 and the closing of the switch I4, in order to introduce dates t5 and t9 enabling the staggering of the voltage and current peaks associated with the switches.

In an embodiment of the invention, an auxiliary circuit is connected to terminals of an oscillation circuit connected to the inverter. The auxiliary circuit duplicates change-over switching times of the switches of the inverter. The auxiliary circuit is controlled at times different from those during which the switches of the inverter are controlled. The auxiliary circuit thus limits an overlapping between voltage and current and the terminals of the switches and therefore limits unnecessary dissipation of energy at the instant of triggering. More specifically, to control the change-over switching operations of the switches of the inverter, the auxiliary circuit comprises controlled elements. The auxiliary circuit comprises two assistance circuits, each comprising the transistor that works in a change-over switching mode, and one diode series-connected with this transistor. The two assistance circuits may be parallel-connected with the circuit formed by the switches of the inverter. Furthermore, capacitors parallel-connected with the switches of the inverter may go into a state of resonance with a coil series-connected with the assistance circuits.

One skilled in the art may make or propose various modifications to the structure/way and/or function and/or results and/or steps of the disclosed embodiments and equivalents thereof without departing from the scope and extant of the invention.

What is claimed is:

1. A stabilized power supply comprising:
a first voltage rectifier circuit connected to an alternating electrical power generator;
an inverter circuit connected to the rectifier circuit, the inverter circuit comprising:
a switching circuit comprising a plurality of main switches electrically connected with each other to provide a first set of connection midpoints, and a second electrically different set of connection midpoints, the first voltage rectifier circuit connected between the first set of midpoints;
an oscillation circuit comprising a resonant circuit connected between the second set of midpoints; and
an auxiliary circuit that can be driven and is parallel-connected to the oscillation circuit;
a transformer connected to the inverter;
wherein the transformer is series-connected with the resonant circuit; and
a second rectifier circuit to rectify the alternating signal observable at an output of the transformer;
wherein the auxiliary circuit comprises a set of two series-connected assistance circuits that define first and second assistance circuits, each assistance circuit comprising a transistor and a diode connected in parallel, the auxiliary circuit being configured such that a current I1 can flow in a first direction through the transistor of the first assistance circuit and the diode of the second assistance circuit when the transistor of the first assistance circuit is closed, and such that a current I2 can flow in a second opposite direction through the transistor of the second assistance circuit and the diode of the first assistance circuit when the transistor of the second assistance circuit is closed.

2. The power supply according to claim 1 wherein the inverter circuit comprises a control circuit to drive the auxiliary circuit at different times.

3. The power supply according to claim 1 wherein the inverter comprises capacitors, each parallel-connected with a main switch.

4. The power supply according to claim 2 wherein the control circuit is a microcontroller.

5. The power supply according to claim 1 wherein the resonant circuit comprises a capacitor in series connection with an inductor.

6. The power supply according to claim 1 wherein:
the plurality of main switches comprises a first, a second, a third and a fourth main switch;
the first voltage rectifier circuit has a first electrical connection between the first and the third main switch, and a second electrical connection between the second and the fourth main switch; and
the oscillation circuit has a first electrical connection between the first and the fourth main switch, and a second electrical connection between the second and the third main switch.

* * * * *